Patented Apr. 28, 1942

2,281,070

UNITED STATES PATENT OFFICE 2,281,070

METHOD OF WELDING

Charles H. Jennings, Forest Hills, Pa., assignor to Westinghouse Electric & Manufacturing Company, East Pittsburgh, Pa., a corporation of Pennsylvania No Drawing. Application November 4, 1939, Serial No. 302,915

2 Claims. (Cl. 219—10)

My invention relates generally to welding, and it has reference, in particular, to an improved method of fusion welding.

The object of my invention, generally stated, is to provide an improved process of fusion welding which may be readily and economically used and which shall provide for increasing the speed of the welding operation and produce high quality welds.

The principal object of my invention is to increase the rate of deposit of weld metal in a fusion welding process by utilizing a flux which provides additional heat to the zone of welding to increase the rate of fusion.

A more specific object of my invention is to provide for increasing the rate of deposit of weld metal in a fusion welding process by utilizing a welding flux or composition which functions both as an additional source of heating energy and to furnish at least a portion of the weld metal.

An important object of my invention is to provide a simple and efficient method of electric arc welding with bare electrode wire which shall provide improved weld penetration at increased welding speeds.

Another object of my invention is to provide for increasing the speed of a metallic arc welding process by supplying to the welding zone an exothermically reactive flux which provides additional welding heat, a protective sheath about the arc and forms a coating for the weld metal, so as to produce high quality welds with a bare metallic electrode.

Still another object of my invention is to provide for controlling the composition of the deposited weld metal in a fusion welding process by applying to the zone of welding an exothermic welding flux comprising oxides of the metals it is desired to deposit in the weld and varying the composition of the welding flux.

A further object of my invention is to provide an improved method of fusion welding wherein an exothermically reactive welding flux is utilized to provide a protective coating for, and furnish at least a portion of, the weld metal.

Other objects will, in part, be obvious, and will, in part, appear hereinafter.

In practicing my invention, fusion welding processes in general may be greatly expedited by supplying to the zone of welding, in any suitable manner, a flux which provides an additional source of welding heat, instead of relying upon a single source of welding heat in the nature of an electric arc or gas flame in accordance with the usual practice. By utilizing suitable ingredients the flux may not only be used to furnish a protective coating for the weld metal, but may also be used, in arc welding, to provide a protective blanket about the arc so as to permit the use of bare wire electrodes. In addition, at least a portion of the weld metal and a protective coating therefor may be furnished by the flux.

For example, in one embodiment of my invention, the flux may comprise as the principal ingredients, finely divided particles of an oxide or oxides of the metal or metals, it is desired to deposit in the weld, and a metal, a mixture of metals, or an alloy containing a metal capable of reacting therewith to reduce the oxide or oxides, and having a heat of oxidation sufficiently high so as to react exothermically in reducing the said oxide or oxides. The flux may be supplied to the zone of welding in advance of the electric arc, gas torch, or other principal source of welding heat in any suitable manner. The welding process may then be carried out in the usual manner by progressively moving the arc, torch, or other principal source of heat along the line of the weld in any manner well known in the art to fuse portions of the member being welded and ignite the flux.

Upon being ignited, the principal ingredients of the flux react, producing heat. The heat produced by the reaction of the metal or metals of the flux with the oxide or oxides thereof furnishes additional heat which melts the flux and also assists the principal source of heat both in heating and fusing the member or members being welded, as well as any additional weld metal which may be added from other sources. By thus providing additional heat, the flux assists in securing better penetration as well as increasing the speed of welding. The reaction between the components of the flux results moreover in a reduction of the metal oxide or oxides of the flux, thus providing an additional source of weld metal, so that the speed of welding is still further increased. An oxide slag is also formed by the reaction, which provides a protective coating over the deposited weld metal, so as to shield it from the surrounding atmosphere.

It will be realized that in welding different metals, it may be desirable to vary the composition of the deposited weld metal accordingly or produce alloy welds. By suitably selecting the metallic oxide components of the flux, the composition of the weld metal may be readily controlled. Thus it will be apparent that a wide variety of metallic oxides may be used in practicing my invention under different circumstances. Also, different metals or alloys thereof may be utilized to reduce the oxides under different circumstances, so as to vary the heat produced by the reaction.

For example, when welding mild steels or the like, such as are widely used in structural steel work, in practicing my invention, a flux comprising principally a mixture of finely divided particles of iron oxide and a metal or metals, or alloy thereof of the group such as, for example, aluminum, calcium, manganese, silicon, or magnesium having a higher heat of oxidation than iron and a reasonably low ignition temperature may be supplied to the welding zone in any suitable manner so that there is a supply of flux in the zone of welding, at least slightly in advance of the arc. In this respect it is to be understood that my invention extends also to the use of these metals in their various commercial forms such as, for example, ferromanganese, silicomanganese and the like. Aluminum and iron oxide may, for example, be mixed in substantially the ratio of 1 to 3 or slightly higher by weight, to secure the best results. The welding process may then be otherwise performed in the usual manner, regardless of whether a gas torch, a carbon arc, or a metallic arc is used as the main or principal source of welding heat.

Upon the contact of the arc or other source of welding heat with a flux of the nature described, a chemical reaction, such as represented by the following equation, takes place:

$$3Fe_3O_4 + 8Al \rightarrow 4Al_2O_3 + 9Fe + 721,100 \text{ gm. calories.}$$

This reaction is obviously exothermic, and the relatively large amount of heat produced thereby, is effective both to progressively melt the flux, and assist the principal source of heat to preheat and fuse the member or members being welded along the line of the weld. The arc or other source of welding heat may, therefore, be moved relative to the member or members being welded at a much greater speed than is possible when welding in the usual manner, while still securing the necessary penetration of the weld. Since the melting of the flux not only does not subtract from the heat of the arc or other source of welding heat as in other known processes, but it actually provides additional heat, the welding flux greatly aids the principal source of welding heat in fusing the body member or members being welded, and also any additional weld metal which may be added. The rate of movement of the source of welding heat relative to the member or members being welded may, therefore, be further increased on this account.

It will also be apparent from the above equation that additional weld metal is produced by the reaction of the flux. The metallic oxide or oxides of the flux are reduced to the metallic form so as to fuse with the adjacent portions of the member or members being welded, thus reducing the amount of weld metal which must be deposited by the metallic electrode or filler rod or other source. Thus, the speed of welding may for this reason be further increased, since it is not necessary to retain the arc or other source of welding heat in the same spot for such a length of time as is necessary when all of the weld metal must be deposited from the metallic electrode or filler rod, as in the welding processes heretofore commonly used.

It may further be seen by referring to the above equation representing the reaction between the components of the welding flux, that an oxide or slag, comprising, in this instance, principally aluminum oxide, is produced. The arc is, therefore, not only shielded by any unmelted flux piled about the weld, but it is also protected by the resultant molten slag which forms a blanket about the zone of welding. This slag upon solidifying prevents the surrounding atmosphere from coming into contact with the weld metal, by forming a coating thereover, which prevents too sudden a cooling of the weld metal after the passage of the arc or other source of welding heat, so as to improve the grain structure of the weld metal and also improve the appearance of the weld by providing a smoother surface on the weld metal.

The rate of reaction of a welding flux utilized in my invention may be suitably controlled in any of a number of ways so as to conform with the speed of the welding and prevent the flux from igniting spontaneously too far in advance of the arc or other principal source of welding heat. The rate of the reaction may, for example, be varied by varying the size of the particles of the metallic oxide and reacting metal components of the flux. If desired, a suitable inhibitor, or relatively inert material such, for example, as calcium oxide or calcium carbonate, may be used with the reactive components of the flux to effectively dilute the mixture so as to decrease their rate of reaction. The metallic oxide and the reactive metallic component of the flux may, if desired, be separated, and brought together only slightly in advance of the arc or other source of welding heat in any suitable manner, thus prevtning pre-ignition of the mixture without requiring its dilution. Control of the rate of reaction may also be effected by suitably selecting the reactive ingredients according to their relative activity, to give a flux having the desired rate of reaction.

If an alloy weld is desired, then oxides of the metals it is desired to alloy with the weld metal may be added to the flux in the proper portions. For example, oxides of manganese, silicon, titanium, chromium, vanadium, molybdenum, or the like, may be added to the iron oxide, or used in any desired combination. The metallic oxides may then be reduced by the subsequent chemical reaction with the aluminum or other reducing agent, and alloyed in the deposited weld metal.

In accordance with my invention, the work to be welded may be prepared in the usual manner, whether a joint is to be made between relatively thin sheets by merely abutting the edges thereof, or by bending the edges upwardly at an angle so as to provide additional weld metal at the junction, or whether relatively heavy plates are to be joined. The following is a description of one embodiment of my invention as it may be applied to the butt-welding of relatively heavy plates by electric arc welding with a bare metallic wire electrode, but it is to be understood that I do not intend in any manner to thereby limit my invention to such an application since it is used merely to illustrate one example of how my invention facilitates the fusion welding of metals. The method of my invention may be utilized equally well with all types of fusion welding, whether the members to be welded are thin or thick, whether the welding operation is performed manually or automatically, and whether a gas torch, a carbon arc, or a metallic electrode is to be used as the principal source of welding heat.

As is customary in butt-welding relatively heavy plates of steel or the like, the adjoining edges of the plates may be prepared in any suitable manner such as, for example, by beveling them or otherwise providing a groove therebetween and positioning the plates so that the edges thereof are in the proper alignment, although in practicing my invention it is not necessary to specially prepare or provide a groove between plates having a thickness of five-eighths of an inch or less. If complete penetration is desired, it is preferable to use a backing bar of some form or other, comprising, for example, a copper bar which may be positioned in abridged relation between the plates or parts being welded, along the line of the weld on the underside of the plates, so as to prevent the escape of the molten weld metal and slag from between the plates.

A flux comprising, for example, principally a mixture of finely divided particles of iron oxide and aluminum in substantially the ratio of 3 to 1 by weight, may be supplied to the zone of welding in any suitable manner, being either distributed along the line of the weld prior to the commencement of the welding operation in any suitable manner, if the mixture has been prepared so that the rate of reaction thereof is controlled and it will not ignite spontaneously, or fed from a suitable hopper or the like, in conjunction with the electrode feeding means adjacent the zone of fusion or welding just in advance of the arc or other principal source of heat. The flux may, if desired, be supplied in a sufficient quantity to provide a heaped supply of flux immediately in advance of the welding zone so that the arc is submerged in the flux and thus shielded from the surrounding atmosphere.

Suitable means may be provided for feeding a bare wire electrode, such as, for example, an automatic welding head of any well known type, and an arc may be drawn in the usual manner between the member or members being welded, and the electrode. Upon the arc contacting the flux, the flux ignites. The metallic oxide or oixdes are reduced and additional heat is thereby evolved which is effective in assisting the arc both to preheat the member or members being welded, and effect fusion thereof and of the electrode as it is moved relative thereto in any suitable manner well known in the art of automatic arc welding.

A molten protective blanket comprising, principally an aluminum oxide slag is provided thereby for covering the weld metal. Metallic iron is also produced, which fuses with the metal of the members to provide at least a portion of the deposited weld metal. The metallic electrode provides additional weld metal, and the heat produced by the reaction of the flux also assists in fusing this additional weld metal.

As the arc or other source of welding heat is moved along the line of the weld, the flux melts or ignites progressively, slightly in advance of the arc or other source of heat, this distance being controlled by varying the rate of reaction of the flux in any of the manners hereinbefore disclosed. By controlling the rate of ignition of the flux and the relative amount of head produced thereby, the penetration of the weld may be varied as desired. Thus, the relationship of the flux reaction to the principal source of welding heat, in this instance, the arc, may be varied so that the proper preheating effect may be provided and undesirable gaseous and slag inclusions in the weld metal may be obviated. The protective slag coating resulting from the reaction provides an inert blanket over the deposited weld metal to exclude the atmosphere therefrom and prevent the formation of undesirable oxides and nitrides in the weld metal.

In practicing my invention, it is possible when butt-welding plates having a thickness of up to approximately one inch to secure sound, high quality welds with a bare wire electrode in a single pass, using an automatic welding head of a well known type for feeding the electrode. Welds have been made between plates having a thickness of one-half inch using a one-quarter inch diameter electrode in an automatic welding head of the usual type and a current of approximately 1100 to 1175 amperes, with an arc voltage of from 34 to 37 volts at a speed of from 23 to 26 inches per minute. The resultant welds show complete penetration and the complete absence of gaseous inclusions. Such good penetration is obtained that it is not necessary to specially prepare the edges of plates having a thickness of three-eighths inch or less, to provide a groove therebetween, as is necessary in welding plates of this thickness in the usual manner. Plates of even greater thickness may be welded in a single pass without special preparation of the edges and welds obtained that are sound and strong.

From the foregoing description, it will be apparent that my invention provides a simple and effective method of fusion welding whereby welded joints may be made at speeds much greater than heretofore obtainable with the methods of the prior art. By utilizing an exothermic flux additional heat is furnished so as to pre-heat the members being welded and assist in the fusion thereof. A protective slag coating is also provided without detracting from the main source of welding heat, and an additional source of weld metal is also provided, so that it will be apparent that many of the difficulties hereinbefore encountered in the fusion welding are overcome. The difficulty of conducting sufficient current through the metallic electrode to obtain the desired welding heat, for example, is obviated since additional heat is furnished by the flux. An increased rate of fusing or melting of the member or members being welded is secured. Better weld penetration results and by obtaining the desired concentration of welding heat, the difficulty of obtaining the desired grain structure has been overcome. Thus, fusion welding may be performed at speeds much greater than heretofore obtainable, not only without reducing the depth of penetration of the welds obtained, but at the same time actually obtaining welds improved in both quality and appearance.

While certain changes may be made in the above description, and different embodiments of the invention may be made without departing from the spirit thereof, it is intended that everything disclosed in the above description shall be considered as illustrative, and not in a limiting sense.

I claim as my invention:

1. A metallic electric arc welding process which comprises, depositing a powdered flux along the line of a weld on a member to be welded comprising a metallic oxide and a metal having a higher heat of oxidation than the metal of the oxide, striking an arc between a metallic electrode and the member to be welded, moving the electrode along the line of the weld while maintaining an arc voltage on the order of 35 volts and an arc current on the order of 1150 amperes to traverse the arc and melt and ignite the flux mixture on the member in advance of the arc so as to cause the flux mixture to react exothermically upon the member to produce additional welding heat and deposit at least a portion of the weld metal.

2. An arc welding method comprising the steps of drawing an electric arc between an electrode and a member to be welded, supplying a heaped amount of a flux comprising a mixture of particles of iron oxide and aluminum to the member ahead of the zone of welding, maintaining an arc voltage of at least 34 volts and an arc current of at least 1100 amperes, and effecting relative movement of the arc and the member to be welded so as to melt and ignite the flux on the member and supply additional welding heat and provide a slag covering for the weld metal.

CHARLES H. JENNINGS.